No. 892,451. PATENTED JULY 7, 1908.
S. ROBINSON.
BEATER FOR MANURE SPREADERS.
APPLICATION FILED JAN. 20, 1908.
2 SHEETS—SHEET 1.
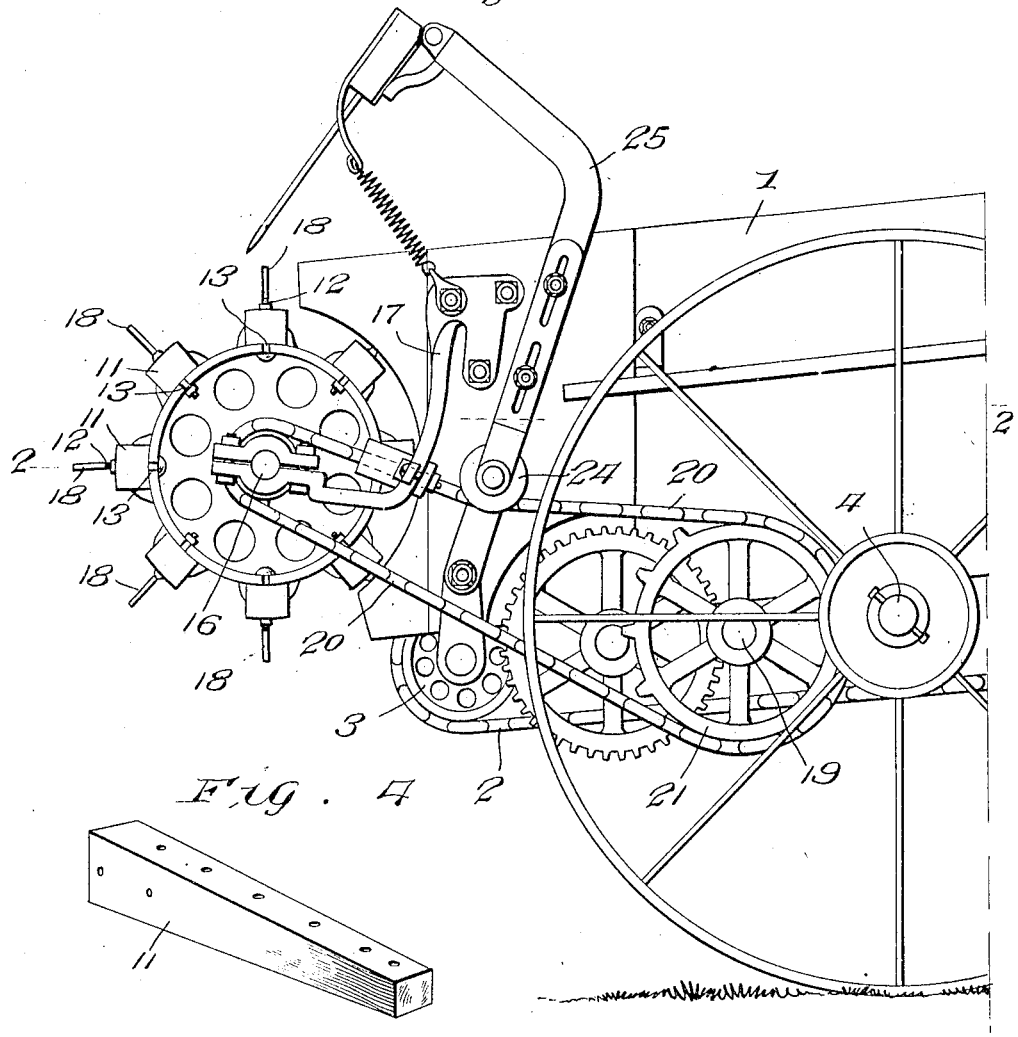
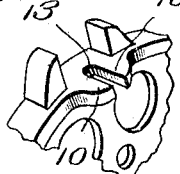
WITNESSES:
INVENTOR
S. Robinson
BY
W.J. FitzGerald & Co
Attorneys

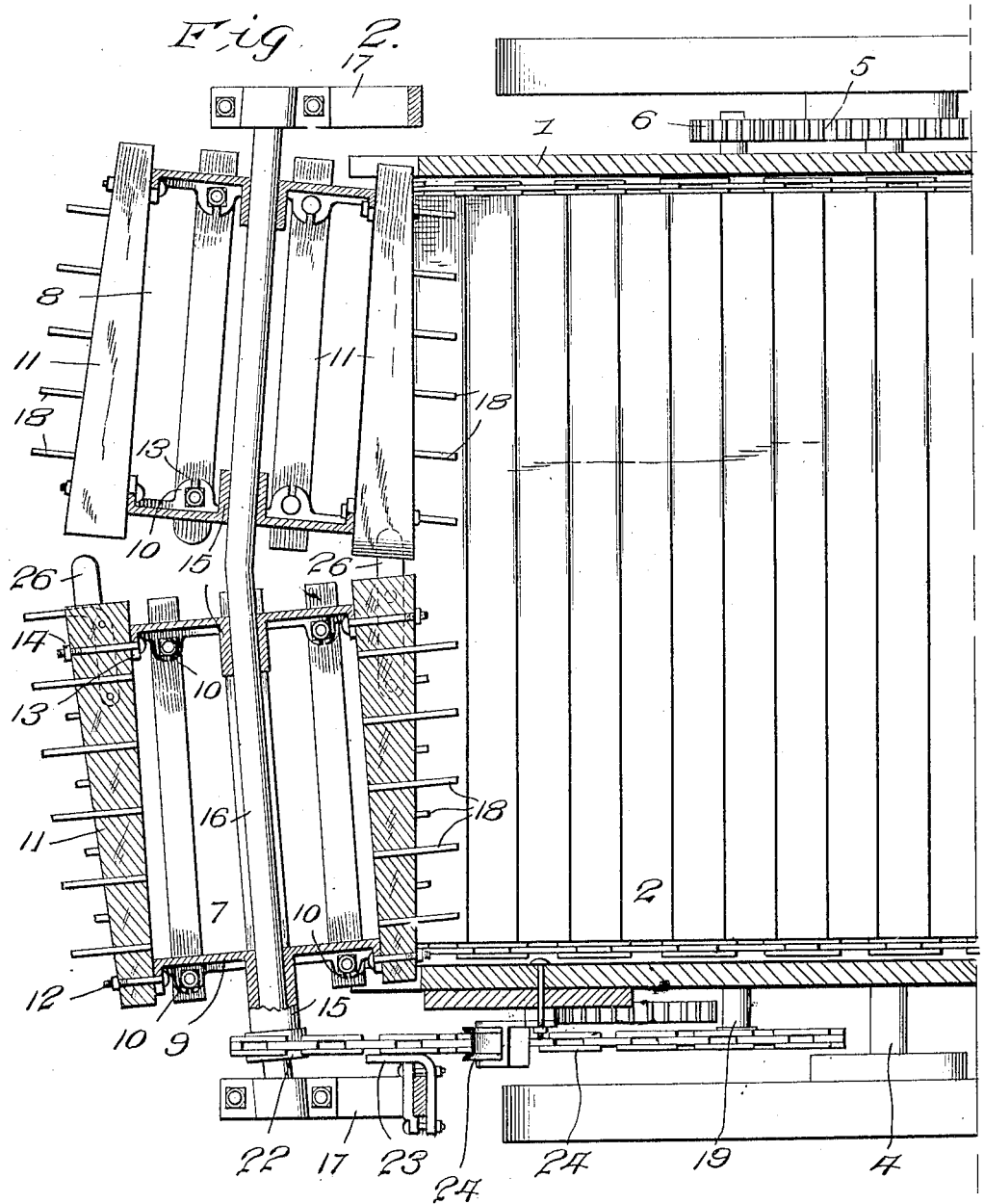

UNITED STATES PATENT OFFICE.

STINSON ROBINSON, OF VINTON, IOWA.

BEATER FOR MANURE-SPREADERS.

No. 892,451.　　　　Specification of Letters Patent.　　　　Patented July 7, 1908.

Application filed January 20, 1908. Serial No. 411,690.

*To all whom it may concern:*

Be it known that I, STINSON ROBINSON, a citizen of the United States, residing at Vinton, in the county of Benton and State of Iowa, have invented certain new and useful Improvements in Beaters for Manure-Spreaders; and I do hereby declare the following to be a full, clear, and exact description of the invention, such as will enable others skilled in the art to which it appertains to make and use the same.

My invention relates to new and useful improvements in beaters for manure spreaders, and my object is to form the beater in two sections and taper the same from their meeting to their outer ends.

A further object is to provide means for mounting the beater in position on the bed of the spreader.

A further object is to so mount the two sections of the beater, that the peripheral faces thereof will be parallel with the apron of the spreader, whereby the beater may be located at the end of the apron, instead of over the top thereof and a still further object is to provide means for rotating the sections of the beater in unison.

Other objects and advantages will be hereinafter referred to and more particularly pointed out in the claims.

In the accompanying drawings which are made a part of this application, Figure 1 is a side elevation of the rear end of a manure spreader, showing my improved beater attached thereto. Fig. 2 is a sectional view thereof, as seen on line 2—2, Fig. 1. Fig. 3 is a detail, perspective view of a portion of one of the spiders employed in forming a beater, and, Fig. 4 is a perspective view of one of the bars employed for carrying the beater prongs.

Referring to the drawings in which similar reference numerals designate corresponding parts throughout the several views, 1 indicates the bed of a manure spreader, at the bottom of which is mounted an apron 2, said apron being disposed around guide rollers 3 and is moved longitudinally of the bed 1 to convey the contents of the bed to the rear end thereof, motion being imparted to the apron from the rear axle 4 through the medium of gears 5 and 6 and intermediate gears (not shown).

In order to disintegrate the manure as it is moved to the rear end of the bed 1 and uniformly spread the same over the ground, I provide my improved form of beater, which is formed in two sections 7 and 8, said sections consisting of spiders 9 having ears 10 thereon, upon which are adapted to rest bars 11, said bars being secured to the ears by means of bolts 12 and in order to readily secure the bars in position on said ears, each ear is provided with a slot 13 extending inwardly from one edge of the ear, so that after the bolt is entered through the bar, the inner ends thereof may be seated in the slots and the bar clamped in position on the ears by means of nuts 14 on the threaded ends of said bolts. The outer faces of the bars 11 are preferably inclined from their outer to their inner ends, so that when the bars are all assembled, the inner ends of the sections will be greater in diameter than the outer ends thereof, the object in so constructing the sections, being to give a greater outward throw to the manure, thus covering a greater surface of the ground than when the beater is the same diameter its full length. If preferred, however, the spiders at the inner ends of the sections may be increased in size, in which event the upper faces of the bars 11 should be parallel with the lower faces, the increased diameter of the inner spiders giving the inclined pitch to the bars. The spiders 9 are provided with tubular hubs 15, which are adapted to receive and rotate upon a shaft 16, said shaft being fixed at its ends to brackets 17 carried by the end of the bed 1, and in order to bring the tapered outer faces of the bars 11 parallel with the apron 2, when said bars are in juxtaposition to the apron, the shaft 16 is bent outwardly at its longitudinal center, thereby disposing said sections in different axial planes and bringing the meeting ends of the bars 11 substantially together adjacent the apron.

Each of the bars 11 is provided with a plurality of prongs 18, which extend a distance from the outer faces of the bars and are adapted to engage the manure carried by the apron and remove and scatter the same as the sections of the beater are rotated and, if preferred, the prongs on each alternate bar may be staggered and caused to travel in a different path from the prongs on the opposite bar and the shaft 16 is so located that the prongs will just clear the apron in their rotating movement and it has heretofore been the custom to extend the apron below the beater, thus adding additional strain on the draft animals, in view of the fact that the weight of the whole load is practically pressing against the beater so arranged, but by constructing the beater in the manner herein shown, this objectionable feature is overcome, from the fact that the sections of the beater extend slightly below the upper surface of the apron and in the rear thereof, this manner of locating the beater removing the pressure of the entire load of manure from the beater, and at the same time, permitting the beater to remove all particles from the apron.

The beater 7 is driven from a shaft 19, to which the gear 6 is secured, by means of a sprocket chain 20, which chain extends around a sprocket 21 on the shaft 19 and around a similar sprocket 22 on one of the hubs 15, the chain 20 being guided onto the sprocket 22 by means of a guide plate 23 carried by one of the brackets 17, while tension is directed onto the chain by means of an idler 24 carried by an adjustable arm 25, the lower end of which arm is secured to the bed 1.

The section 8 is simultaneously rotated with the section 7, by securing to the ends of a portion of the bars 11 forming the section 7, plates 26, the ends of which project beyond the inner ends of the bars 11, to which they are secured and engage corresponding bars 11 on the section 8, thereby causing the section 8 to rotate with the section 7, or spurs or teeth may be placed on the meeting faces of the inner spiders in such manner as to intermesh with each other and impart rotating movement to the section 8.

It will thus be seen that I have provided a very cheap and efficient form of beater for use in connection with a manure spreader and one wherein the manure will be given an outward throw and spread over a considerable surface of the ground.

It will further be seen that by arranging the sections of the beater in the manner shown, all the particles will be removed from the apron and the strain upon the animals required to operate the spreader, reduced.

It will further be seen that by tapering the outer faces of the bars forming the sections of the beater, or enlarging the inner spiders, the meeting ends of the sections will be greater in diameter than the outer ends thereof, thus causing the contents of the spreader to be thrown outwardly or laterally and the tapered faces brought parallel with the apron by extending the shaft 16 in the manner shown.

What I claim is:

1. The herein described beater for manure spreaders, comprising the combination with a bed and means to move the contents of the bed to the rear end thereof; of a beater formed in two sections, the meeting ends of said sections being greater in diameter than the outer ends thereof, said sections being so mounted one with relation to the other that the faces thereof when opposed to the body, aline, and means to simultaneously rotate said sections.

2. A beater of the class described, said beater being formed in two sections, the meeting ends of said sections being greater in diameter than the opposite ends thereof, each section consisting of a pair of spiders, laterally extending ears on said spiders, a plurality of bars carried by said spiders, the outer faces of which are inclined, a plurality of prongs carried by said bars, means to secure said bars to the spiders and additional means to rotate said sections in unison.

3. A beater of the class described, comprising the combination with a shaft; of beater sections, said sections comprising spiders of equal diameter, bars carried by said spiders, the outer faces of which are inclined, whereby the inner ends of said sections will be greater in diameter than the outer ends thereof, said sections being so mounted, that when said bars are in one position, the tapered faces of two of the bars will rest in the same longitudinal plane.

4. A beater of the class described, comprising the combination with a shaft; of a pair of beater sections mounted on said shaft, the meeting ends of said sections being greater in diameter than the outer ends thereof, said shaft being bent at a point between the two sections, whereby the axial centers of said sections will be in different planes and means to rotate said sections in unison.

In testimony whereof I have signed my name to this specification in the presence of two subscribing witnesses.

STINSON ROBINSON.

Witnesses:
W. L. THOMAS,
GEO. W. ROBINSON.